*J. B. Johnson,*

*Channeling Tool,*

No. 39,366. Patented July 28, 1863.

Witnesses:
F. R. Hale Jr.
Frederick Curtis.

Inventor:
Joseph B. Johnson
by his attorney
R. H. Eddy

UNITED STATES PATENT OFFICE.

JOSEPH B. JOHNSON, OF LYNN, MASSACHUSETTS, ASSIGNOR TO JOHN B. NICHOLS, OF SAME PLACE.

IMPROVED CHANNELING-TOOL.

Specification forming part of Letters Patent No. 39,366, dated July 28, 1863.

*To all whom it may concern:*

Be it known that I, JOSEPH B. JOHNSON, a resident of Lynn, in the county of Essex and State of Massachusetts, have invented an Improved Tool or Apparatus for Channeling Soles; and I do hereby declare the same to be fully described in the following specification, and represented in the accompanying drawings, of which—

Figure 1:
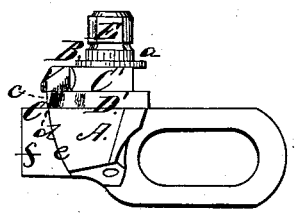
Figure 5:
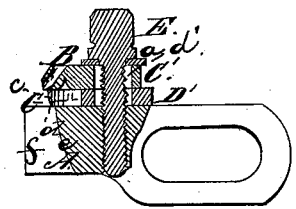
Figure 2:
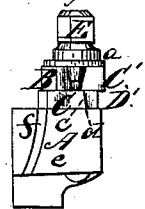
Figure 3:
Figure 4:

Figure 1 is a side view of it; Fig. 2, an edge view of it; Figs. 3 and 4, front views of its separate cutters; Fig. 5, a vertical section taken through the cutters and their confining-screw.

My invention is an improvement on that invented by James Dillon, and patented by him and John B. Nichols by Letters Patent numbered 36,880, and dated the 4th day of November, A. D. 1862.

It has been found in the use of the tool as made by the said Dillon that it is frequently desirable to vary the depth of the channel cut by it, as well as to sharpen its cutters, but, owing to the two cutters being made in one solid piece of metal, they were incapable of adjustment relatively to each other, and besides could not be sharpened to so good advantage as is desirable; and furthermore, such tool had no guide-stock or gage.

In my improved implement the two cutters—viz., the tubular cutter B and the angular seat-cutter C (the latter being provided with two cutting-edges, $c\ d$, one standing at or about a right angle to the other)—are made on separate flat pieces $C'\ D'$ of metal, which are united to a bearing and guide-stock, A, by means of a screw, E, which goes through the parts $C'\ D'$ and screws into the stock, the said screw having a head to bear against a washer, $a$, interposed between it and the part B of the tubular cutter. The socket or hole $d'$ through each part $C'\ D'$ is to be made of a diameter so much larger than that of the shank of the screw E as to admit of the required adjustment of the cutters. The stock A is provided with a bearing-surface, $e$, and a guide-lip, $f$, they being intended to support or gage the cut or channels with respect to the flat surface and edge of a sole.

This construction of the channeling apparatus, it will be seen, admits of the proper adjustment of the two cutters relatively to one another, and it also admits of their being removed from one another and the stock so as to be sharpened.

I do not claim a sole-channeling tool as made with one tubular and one or more angular or other cutters united to a shank, and so that the whole shall be one solid piece of metal, the same being as shown in the said Patent No. 36,880; but

I claim—

My improvement thereon, or my improved sole-channeling apparatus as made of the separate tubular and angular cutters B C and a guide-stock, A, made substantially as described, fastened together by one or more screws or devices, which will admit of such cutters being adjusted with reference to one another, as well as either one or both being removed from the stock, for the purpose of being sharpened, or for any other purpose, as circumstances may require.

J. B. JOHNSON.

Witnesses:
   JOHN P. WOODBURY,
   P. R. RUSSELL.